United States Patent [19]

Loiseau

[11] 4,359,839

[45] Nov. 23, 1982

[54] APPARATUS FOR BURNING BEARD OF SEED

[75] Inventor: Roger Loiseau, Le Mans, France

[73] Assignee: Loiseau Semences, Arnage, France

[21] Appl. No.: 197,989

[22] PCT Filed: Dec. 20, 1979

[86] PCT No.: PCT/FR79/00128
§ 371 Date: Oct. 6, 1980
§ 102(e) Date: Oct. 6, 1980

[87] PCT Pub. No.: WO80/01531
PCT Pub. Date: Aug. 7, 1980

[30] Foreign Application Priority Data

Feb. 6, 1979 [FR] France ............................ 79 02969

[51] Int. Cl.³ .............................................. A01C 1/00
[52] U.S. Cl. ..................................................... 47/58
[58] Field of Search ........................................... 47/58

[56] References Cited

U.S. PATENT DOCUMENTS

| 354,109 | 12/1886 | Dudley | 47/58 |
| 2,437,397 | 3/1948 | McLemore | 47/58 |
| 2,750,977 | 6/1956 | Vella et al. | 99/637 |
| 4,064,636 | 12/1977 | Downing | 47/58 X |
| 4,203,254 | 5/1980 | Downing | 47/58 |
| 4,261,139 | 4/1981 | Pogue | 47/58 |

FOREIGN PATENT DOCUMENTS

| 322512 | 10/1915 | Fed. Rep. of Germany . |
| 915873 | 6/1954 | Fed. Rep. of Germany . |
| 1244464 | 9/1960 | France . |

Primary Examiner—Robert E. Bagwill
Attorney, Agent, or Firm—Spencer & Kaye

[57] ABSTRACT

Device for trimming aristate seeds comprising a vertical spout wherein the seeds to be trimmed travel by gravity counter to a light air flow passing through one of the alveolate plates of a conveyer. In the flow-orientated position, the seeds are housed in one of the alveoli of the plate to be presented in this position to a trimming station comprised for example of a horizontal gas ramp positioned transversally to the direction in which the conveyer is translated.

5 Claims, 3 Drawing Figures

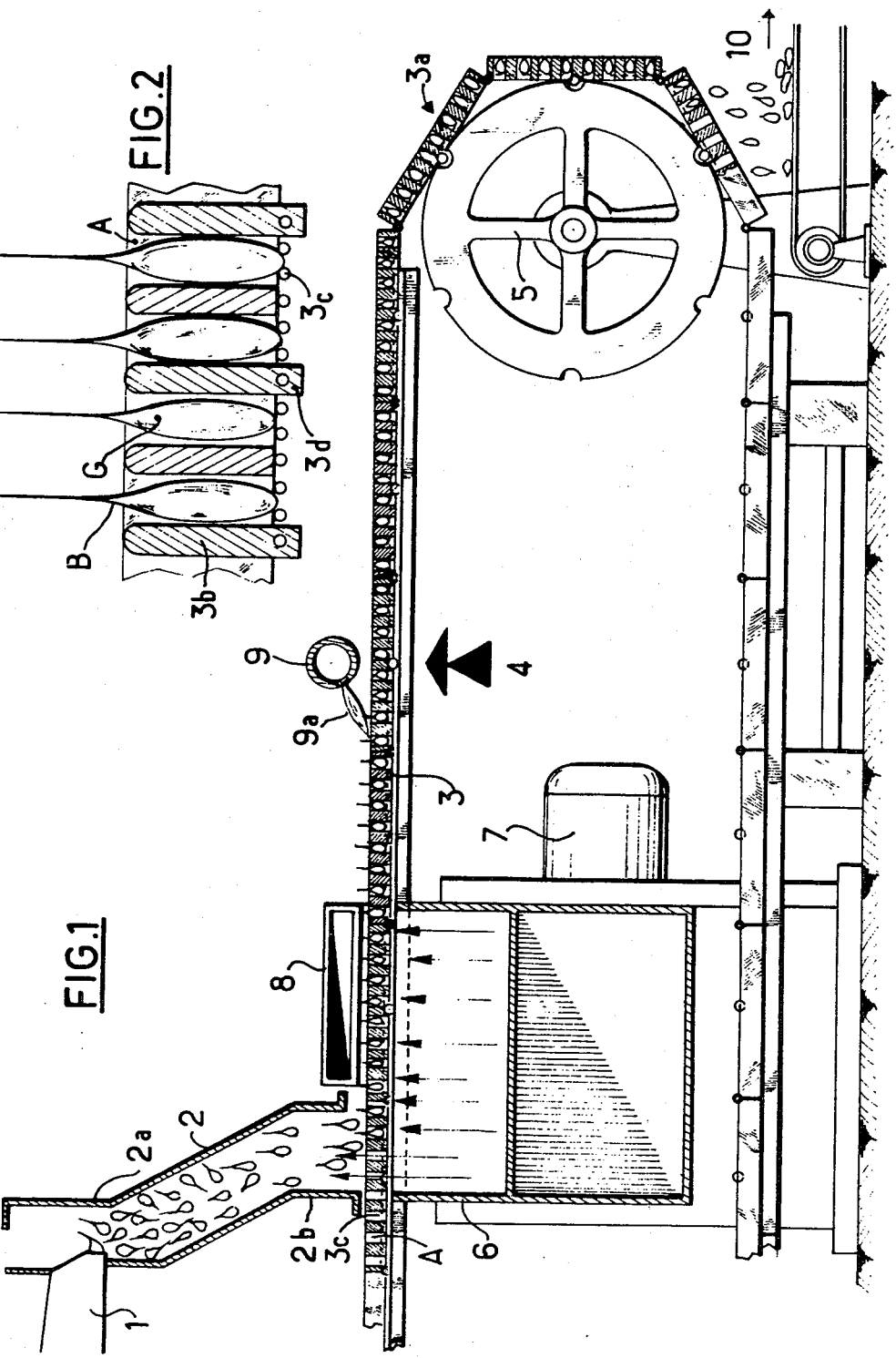

APPARATUS FOR BURNING BEARD OF SEED

BACKGROUND OF THE INVENTION

The present invention relates to a novel device for trimming grains and seeds, so-called "aristate" grains and seeds because their caryopsises extend in an awn, such as the grain or seed of the grass of the genus bromus (*bromus catharticus*). It is said that such grains or seeds are difficult to sow by means of a machine as their awns intermingle and prevent them from flowing steadily into the channels of the device. The result is an irregular seed-bed. In some areas there is little or no seed whereas in other places there is too much seed. Consequently the use of seed per hectare is out of proportion. The efficiency could be doubled.

In order to remedy the abnormal use of seed it has been suggested to trim the seeds beforehand, either by hurling them vigorously against a rough surface or by threshing them with a flail (such as in German Pat. No. 322512). Such methods are not acceptable for certain species which are too fragile to stand up to such a treatment without being damaged.

The obvious thought is to cut or to singe the awns but in order to prevent the seeds from being damaged during the operation it is not only necessary to keep them upright so as to cut them correctly but also to protect them against destruction of the awns during the operation.

German Pat. No. 915873 therefore suggests to singe the awns and the husks of the seeds by throwing them in the flame of a burner. This method has the disadvantage that the awn and the husk may be destroyed at once as the heat may burn the caryopsis not only superficially but often to the extent that it reaches the core thereby sterilizing the germ.

The problem to overcome is therefore to maintain the grain in a predetermined position during the trimming operation. The problem is even greater if one considers that, on the one hand, for the sake of efficiency a multitude of seeds has to be treated simultaneously, whereas on the other hand, the dimensions of each seed are very small. In effect, the problem consists of two parts, namely to provide a steadfast orientation to the grain and to maintain it in this orientation during the trimming operation.

It has already been suggested to orient the grains of the kind described above by placing them in a strong current of air so as to move them toward a screen whereby the awns act as arrows. In French Pat. No. 1,244,464 filed by Monsieur Roger LOISEAU on Sept. 18, 1959, this orientation method is used to sort grains having an eccentric caryopsis such as Ray-grass. The inventor has tried to use an analogous method to solve the problem described above but it was soon noted that no results could be expected because, although the grains carried away by the air current assumed a unique orientation, the second part of the problem could not be solved. In other words, the principle is perfectly sound for a dynamic process but not for a continuous one.

U.S. Pat. No. 2,750,977 discloses a device for peeling onions having a conveyor comprising a sturdy metallic mesh which causes the onions to pass in front of a knife blade while the onions are maintained in a substantially vertical position by means of a flow of air passing through the conveyor. Although this specification suggests orienting the product to be treated by means of air under high pressure, it is impracticable to follow this suggestion for the material in question. An onion has sufficient weight to put it into a vertical position by means of gravity but a grain is light and does not allow using high pressure. Its shape does not allow a stable position especially in such a device and it would be difficult to feed the product, i.e. the grains, already oriented to the conveyor.

SUMMARY OF THE INVENTION

The object of the invention is to provide a device which utilises a gas at a slight pressure to orient the grains and to place them in cavities to maintain them in the oriented position and to protect them during the trimming operation. Other details and advantages of the invention will become clear from the description and the claims which follow.

BRIEF DESCRIPTION OF THE DRAWINGS

FIG. 1 is a partial schematic representation of a longitudinal section of a device according to the invention.

FIG. 2 is a detailed view on an enlarged scale.

Figure 3:
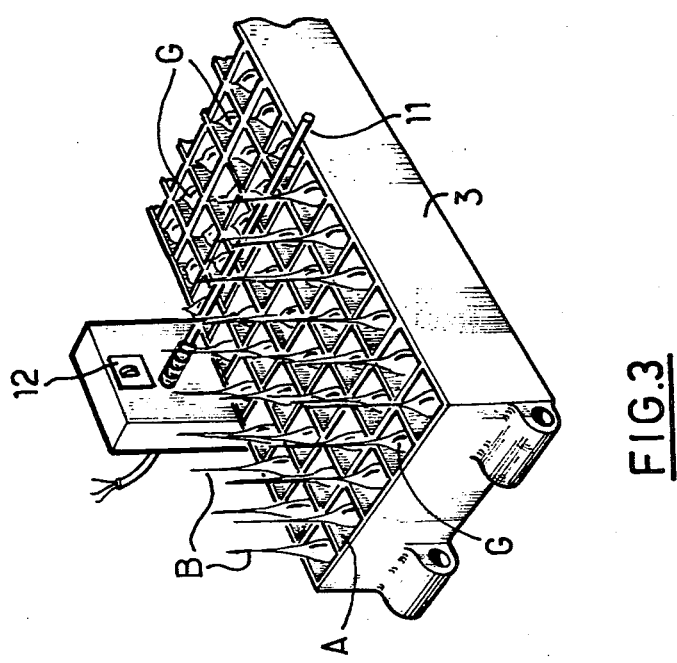
FIG. 3 is a partial perspective view of a device according to the invention using an energized electrical resistance device to remove the awn.

As is clear from FIG. 1 in particular, the device comprises a feeder 1 which causes the grains to be trimmed to flow to an upper portion 2a of a substantially vertical channel member 2 in which the grains fall by gravity toward a conveyor 3 for guiding them to a trimming location 4. The conveyor comprises perforated aveolate plates 3a which are jointed together like the links of a chain and are driven by drums or gears 5.

Underneath part of the conveyor 3 there is an evacuation chamber having air at low pressure blown in by a fan or compressor 7. The flow of air traverses the perforated plates 3a. The channel is disposed above at least a portion of the chamber 6 in such a manner that a portion of the pulsating air goes upstream in the channel 2.

At the exit of the feeder 1 and in the upper portion 2a of the channel 2 the grains fall freely without exact orientation while their awns are entangled. They meet the flow of ascending air which disentangles, separates and orients them such that in a lower output portion 2b of the channel 2, on the one hand, they fall down while being restrained and oriented with the awn at the top, but on the other hand, their flow is "fluid". The first requirement of adequate trimming, i.e. steadfast orientation of the grains, is therefore met.

Each plate 3a comprises vertical bars 3b which cross and are disposed above a wire netting 3c (FIG. 2). Two consecutive bars 3b and the wire netting at the bottom form a cavity A for receiving one or more grains G which fall down in an oriented fashion from the channel 2 with the awn pointing upwardly. The vertical faces of the bars 3b, on the one hand, maintain the oriented grains in this position and, on the other hand, act as a baffle to avoid destruction by the trimming means described hereinafter. The height of the bars is such that the caryopsis of the grain is completely contained in the cavity with the awn B sticking out only.

Some bars extend downwardly in a collar 3d for engaging the conveyor by means of the drums or the gears.

The flow density of the grains which fall onto the conveyor 3 is nevertheless distinctly greater than that of the grains in the cavities A in order to achieve filling to a maximum thereof.

To eliminate the grains in excess a jet of air is used which is disposed cross-wise over the conveyor and which terminates in a nozzle 8, and which separates them from the conveyor 3 so that they can be recycled. This air jet co-operates with the flow conveyed through the portion of the chamber 6 disposed below the channel 2. In this way the excess grains remains essentially oriented while they are being removed which prevents their awns from being mixed with grains which have to be trimmed. At a location 4 the aligned grains subsequently face a device for destroying the awns thereof which is disposed traversely to the conveyor and in the direction of motion thereof and level with the upper opening of the cavities.

In FIG. 1 the device for destroying the awns is a row of gas burners 9 having a quasi-horizontal flame 9a or at the very least a flame which is inclined slightly. The flame can only reach the awn but not the caryopsis which is protected by the bars 3b.

The gas burners 9 may be substituted for by an electrical resistance device, as shown in FIG. 3. In this embodiment, a high resistance wire 11 is heated by applying a voltage thereto by means of a switch 12. Wire 11 is located immediately above the cavities A in the conveyor 3 and removes the awns B from the grains G as the conveyor moves toward location 10 where the trimmed grain is emptied.

The device described above finds application in trimming of fragile aristate seeds such as grains of grass of the genus bromus.

I claim:

1. A device for trimming grains each having a caryopsis and an awn projecting therefrom, comprising:
    a substantially vertical channel member having a lower portion and an upper portion, said upper portion receiving said grains which fall freely into said upper portion without exact orientation;
    a conveyor positioned below the lower portion of said channel member for movement in a substantially horizontal plane, said conveyor including a plurality of spaced essentially vertically oriented elements and a substantially horizontal netting located below and transverse to said elements, said elements and netting defining a plurality of cavities;
    blowing means for blowing a current of air upward into the lower portion of said channel, said current of air orienting said falling grains with their awns projecting generally vertically upward, said grains falling into the cavities in said conveyor with their caryopsises contained within said cavities and supported on said netting, the awns projecting vertically upward from said cavities; and
    trimming means positioned adjacent to and above said conveyor downstream from the lower portion of said channel member, said trimming means destroying the awns transported thereto by said conveyor without damaging the caryopsises.

2. A device according to claim 1, wherein said conveyor is interposed between the lower portion of said channel member and said blowing means, the current of air blown upward by said blowing means passing through said netting and said cavities into the lower portion of said channel member.

3. A device according to claim 1 or 2, wherein the heights of the vertically oriented elements of said conveyor are substantially the same as that of the caryopsises of the grains to be trimmed, and only the awns of said grains project above said elements.

4. A device according to claim 1, wherein said trimming means comprises a row of gas burners having a flame directed substantially parallel to the surface of said conveyor, said flame being directed such that it reaches and destroys only the awns of the grains and not the caryopsises.

5. A device according to claim 1, wherein said trimming means comprises an electrically heated resistance wire disposed transverse to said conveyor, parallel to the surface thereof and adjacent said vertically oriented elements defining said cavities, said heated resistance wire destroying only the awns of the grains and not the caryopsises.

* * * * *